(12) United States Patent
Holmer et al.

(10) Patent No.: US 7,839,791 B2
(45) Date of Patent: Nov. 23, 2010

(54) SYSTEMS AND METHODS FOR NETWORK ROUTING

(76) Inventors: David G. Holmer, 233 E. 34th St., Apartment 3R, New York, NY (US) 10016; Herbert B. Rubens, 1249 Park Ave., Apt. 2D, New York, NY (US) 10029

( * ) Notice: Subject to any disclaimer, the term of this patent is extended or adjusted under 35 U.S.C. 154(b) by 131 days.

(21) Appl. No.: 12/217,016

(22) Filed: Jun. 30, 2008

(65) Prior Publication Data

US 2009/0046714 A1 Feb. 19, 2009

Related U.S. Application Data

(60) Provisional application No. 60/937,744, filed on Jun. 29, 2007.

(51) Int. Cl.
*G01R 31/08* (2006.01)
(52) U.S. Cl. .................... 370/238; 370/392; 370/394; 709/242
(58) Field of Classification Search ........................ None
See application file for complete search history.

(56) References Cited

U.S. PATENT DOCUMENTS

| 7,035,937 | B2 * | 4/2006 | Haas et al. ................... 709/239 |
| 2003/0033394 | A1 * | 2/2003 | Stine ........................... 709/222 |
| 2006/0126535 | A1 * | 6/2006 | Sherman ..................... 370/254 |
| 2007/0280192 | A1 * | 12/2007 | Yagyu et al. ................. 370/349 |

* cited by examiner

*Primary Examiner*—Duc C Ho
(74) *Attorney, Agent, or Firm*—Scully, Scott, Murphy & Presser, PC

(57) ABSTRACT

Systems and methods are provided for routing data through a network. In one system, a first node is enabled to overhear packet transmissions from a second node. The cost of transmitting packets from the first node to the second node is updated based on each overheard packet transmission. In another system, when the cost of transmitting packets from a source to an overhearing node to a destination is less than the cost of transmitting packets from the source to the destination, an advertisement is sent to the source causing the packet transmissions to be routed from the source to the destination through the overhearing node. In yet another system, using a safe-sequence tag that is attached to any packet transmitted by any node and updated when it is received by another node, along with stored histories of best metric advertisements, predetermined rules are applied to maintain loop freedom.

10 Claims, 3 Drawing Sheets

SYSTEMS AND METHODS FOR NETWORK ROUTING

CROSS REFERENCE TO RELATED APPLICATION

This application claims priority to U.S. provisional patent application No. 60/937,744, filed Jun. 29, 2007, which is incorporated herein by reference in its entirety.

FIELD OF THE INVENTION

This invention relates generally to routing data, and more particularly to protocols for routing data in ad hoc computer networks.

BACKGROUND OF THE INVENTION

Networks are used to connect multiple devices, such as computers. A Mobile Ad hoc Network or MANET consists of two or more potentially mobile devices, often referred to as "nodes," that form a self-organizing network. Data is usually broken into "packets" that are sent from one device to another. The devices communicate wirelessly by relaying or forwarding data across the network through a sequence of wireless packet transmissions, hopping from one node to another. A sequence of transmissions that enables data from a given source to reach a specific destination is referred to as a route. One route might involve only two nodes: the source and destination. Another route might involve three nodes: the source node, a neighboring node in range of the source, and the destination node. Other routes might include several, or dozens, or even more neighboring or intermediate nodes between the source and the destination. A MANET uses a routing protocol to determine the route between sources and destinations.

In a MANET the devices may join and leave the network at any time. The dynamic nature of the network requires a routing protocol that can handle such frequent topological changes. The two primary categories of routing protocols used in MANET's are proactive and reactive. Proactive routing protocols actively track routes between all nodes in the network regardless of whether or not the nodes are actively sending or receiving data packets. Reactive protocols setup routes on-demand when a source has data that needs to be delivered to a specific destination. Despite their differences in approach, both techniques generally select a single route on which data is forwarded from a given source to a destination. The selection of a single route is generally determined by a number of factors, including hop count, signal-to-noise ratio, delay, data-link rates, and reliability. These factors can be used to establish a link metric that the routing protocol accumulates in order to determine a preferred communication route from a source to a destination.

Another significant challenge to MANET routing protocols is that the quality of the wireless links in the network continuously changes. Changes occur due to the mobility of nodes and changes in the environment that result in channel fading and fluctuating link characteristics. As the link characteristics continuously change, the link metrics change. If changing link metrics between a source and a destination favor changing routes, and if the protocol is aware of the changed link metrics, then the protocol will change the route from the one currently selected to one with better link metrics. A routing protocol that is able more accurately and quickly to adapt to the continuously changing channel conditions is able to achieve higher performance and improved overall network efficiency.

MANET routing protocols typically use control packets—that travel along with or separate from the data packets—to exchange information that is used to select and establish routes. The control packets generally contain a metric that represents either the cost of a link or the accumulated cost of a path. They also generally contain a sequence number that enables the protocol to determine a temporal ordering of the information. The routing protocol processes a sequence of asynchronous information, meaning that topology updates will not necessarily be received by neighboring nodes in any particular order. In addition, the wireless medium is susceptible to packet loss resulting in transmissions that are not received. The asynchronous lossy environment in which MANET routing protocols operate can result in a protocol learning information about routes with an inferior routing metrics before they eventually learn of routes with better routing metrics.

In a routing protocol, nodes typically establish and maintain routes to destinations by the use of routing "advertisements" in control packets. The specific contents that comprise a route advertisement vary depending on the routing protocol, but generally receiving an advertisement updates a node's knowledge of its available forwarding options. A node's forwarding options for a particular destination consist of the set of possible next hops (neighboring nodes) and a metric for each of these options. In a number of known routing protocols, a node must make an advertisement based on the information it received so that the link metrics about a route will propagate through all the nodes in the network.

Once a node has selected a next hop, and made an advertisement under a given sequence number, it is generally restricted on changing it's next hop selection, since other nodes may have already made next hop selections and advertisements that were based on the node's previous advertisement. The hop-by-hop metric-accumulation process often used by MANET routing protocols creates a transitive dependency on the information shared between nodes. If nodes in the network changed their advertisements (within the context of a single sequence number) "routing loops" could occur in the network.

A routing loop exists when routing-state information creates an endless cycle. When packets are routed in a loop, they do not reach their intended destination and instead are fruitlessly retransmitted, consuming shared resources (e.g., the wireless-medium time). In most existing routing protocols, loops occur because of delays in disseminating updated topology information. Some ways are known for designing routing protocols that never create routing loops. These protocols may be described as "instantaneously loop free."

In order to make sure that the routing protocol makes decisions based on all the available information, time delays or settling times are typically employed. These delays are designed to allow a node to wait long enough that there is confidence that it will not hear any newer information (for a given route and sequence number tuple) before it commits to making an advertisement using that sequence number. These time delays accumulate (as routing updates propagate), resulting in significant delays in a node's ability to receive updated topological information.

In an attempt to minimize the undesirable delay in information propagation, some known protocols use adaptive-delay mechanisms, in which the nodes compute the average difference in time from the first received advertisement for a given sequence number until the best received advertisement under the same sequence number. But some delay still exists in these protocols.

It would be desirable to have systems and methods that implement routing protocols that allow the information to propagate instantly, and that are instantaneously loop free.

SUMMARY OF THE INVENTION

Systems and methods for network routing are provided. In one embodiment of the invention, a method for routing data through a network of two or more nodes includes enabling a first node to overhear packet transmissions from a second node; determining a cost of transmitting packets from the first node to the second node; storing state information regarding each overheard packet transmission; and updating as necessary the cost of transmitting packets from the first node to the second node based on each overheard packet transmission.

In another embodiment, the method also includes determining a route from the first node to a third node based on the cost of transmitting packets from the first node to the second node.

In yet another embodiment of the method, the cost of transmitting packets from the first-node to the second node is based at least in part on modulation reception statistics.

In yet another embodiment, a method for routing data through a network of three or more nodes includes enabling an overhearing node to overhear packet transmissions from a source node to a destination node; determining a cost of transmitting packets from the source node to the destination node; determining a cost of transmitting packets from the source node to the overhearing node to the destination node; and storing state information regarding each overheard packet transmission. The method also includes updating as necessary the cost of transmitting packets from the source node to the destination node, and the cost of transmitting packets from the source node to the overhearing node to the destination node, based on each overheard packet transmission. When the cost of transmitting packets from the source node to the overhearing node to the destination node is less than the cost of transmitting packets from the source node to the destination node, sending an advertisement to the source node causing the packet transmissions to be routed from the source node to the destination node through the overhearing node.

In yet another embodiment, a method for routing data through a network of three or more nodes includes, for a first route from a source node to a destination, generating one or more advertisements with increasing sequence numbers, and for a second route from the source node to the destination node through an intermediate node, generating one or more advertisements with increasing sequence numbers. The method also involves including as metrics in each advertisement a current cost estimate for reaching the destination node and a minimum cost estimate for reaching the destination node advertised for the sequence number, and including a safe-sequence tag with any packet transmitted by any node. The method further updates each safe-sequence tag when it is received by another node; stores in the source node a first history of best metrics for the first route; stores in the source node a second history of best metrics for the second route; and stores in the source node a third history of advertisements made by the source node. The method also applies predetermined rules to the minimum cost estimates in the first, second, and third histories to maintain loop freedom.

In yet another embodiment, the method further includes storing in each node in the network a plurality of histories of best metrics, each history corresponding to one of a plurality of routes to a plurality of destination nodes and one of one or more next-hop nodes to each destination node.

In yet another embodiment, a computer network includes two or more nodes, each comprising a computer processor and data storage; means for processing data regarding enabling a first node to overhear packet transmissions from a second node; means for processing data regarding determining a cost of transmitting packets from the first node to the second node; means for processing data regarding storing state information regarding each overheard packet transmission; and means for processing data regarding updating as necessary the cost of transmitting packets from the first node to the second node based on each overheard packet transmission.

In yet another embodiment, the computer network also includes means for processing data regarding determining a route from the first node to a third node based on the cost of transmitting packets from the first node to the second node.

In yet another embodiment of the computer network, the cost of transmitting packets from the first node to the second node is based at least in part on modulation reception statistics.

In yet another embodiment, a computer network includes three or more nodes, each comprising a computer processor and data storage; means for processing data regarding enabling an overhearing node to overhear packet transmissions from a source node to a destination node; means for processing data regarding determining a cost of transmitting packets from the source node to the destination node; means for processing data regarding determining a cost of transmitting packets from the source node to the overhearing node to the destination node; means for processing data regarding storing state information regarding each overheard packet transmission. The network also includes means for processing data regarding updating as necessary the cost of transmitting packets from the source node to the destination node, and the cost of transmitting packets from the source node to the overhearing node to the destination node, based on each overheard packet transmission. When the cost of transmitting packets from the source node to the overhearing node to the destination node is less than the cost of transmitting packets from the source node to the destination node, means for processing data regarding sending an advertisement to the source node causing the packet transmissions to be routed from the source node to the destination node through the overhearing node.

In yet another embodiment, a computer network includes, for a first route from a source node to a destination, means for processing data regarding generating one or more advertisements with increasing sequence numbers and for a second route from the source node to the destination node through an intermediate node, means for processing data regarding generating one or more advertisements with increasing sequence numbers. The network also includes means for processing data regarding including as metrics in each advertisement a current cost estimate for reaching the destination node and a minimum cost estimate for reaching the destination node advertised for the sequence number, and means for processing data regarding including a safe-sequence tag with any packet transmitted by any node. The network also includes means for processing data regarding updating each safe-sequence tag when it is received by another node; means for storing in the source node a first history of best metrics for the first route; means for storing in the source node a second history of best metrics for the second route; and means for storing in the source node a third history of advertisements made by the source node. The network also includes means for processing data regarding applying predetermined rules to the minimum cost estimates in the first, second, and third histories to maintain loop freedom.

In yet another embodiment, the computer network also includes means for storing in each node in the network a plurality of histories of best metrics, each history corresponding to one of a plurality of routes to a plurality of destination nodes and one of one or more next-hop nodes to each destination node.

In yet other embodiments, a medium storing instructions adapted to be executed by a computer processor to perform methods for routing data according to the invention.

DETAILED DESCRIPTION OF PREFERRED EMBODIMENTS

Figure 1:
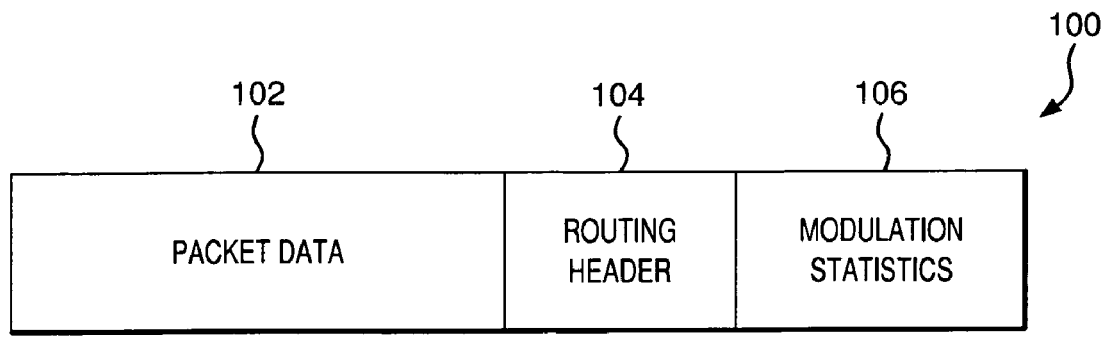
FIG. 1 is a schematic representation of an information packet used in certain embodiments of the invention.
Figure 2:
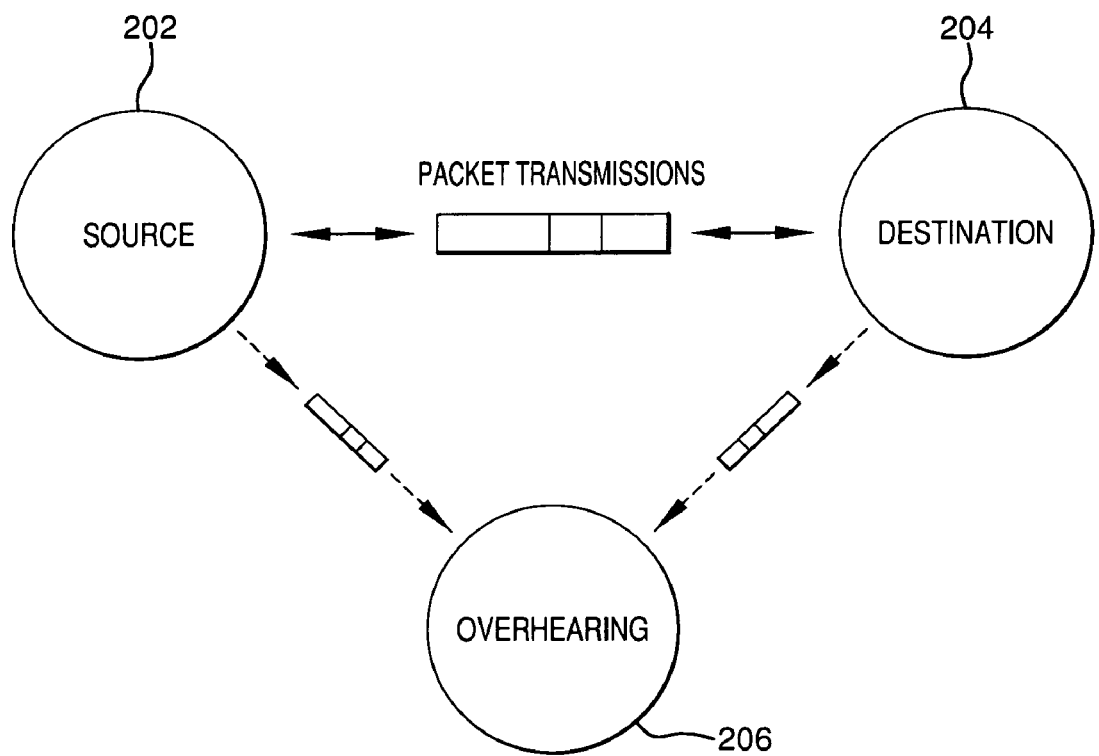
FIG. 2 is a schematic representation of a multi-node network in accordance with certain embodiments of the invention.

FIG. 1 depicts an information packet 100, and FIG. 2 depicts a wireless network including source node 202 and destination node 204. When data is to be sent from source node 202 to destination node 204, the data is divided into one or more data packets 102. One information packet 100 is formed by adding routing information in a routing header 104 to a data packet 102. This is done for as many data packets as needed. Optionally, as will be described for other embodiments of the invention, modulation statistics 106 may be added to information packet 100.

In the network of FIG. 2, while information packets 100 are transmitted from source node 202 to destination node 204, overhearing node 206 "overhears" transmissions from nodes 202 and 204. Preferably, each node in the network can overhear the transmissions of every other node in the network that is within its range. One way to accomplish this is to equip each node with a wireless radio chipset from Atheros Communications, Inc. that may be put into "promiscuous" mode, such that each node receives and processes all transmissions that it is able to receive, not just packets specifically addressed to it.

In the example of FIG. 2, each information packet 100 includes data packet 102 and, in routing header 104, node transmission data concerning transmissions made by the node transmitting the information packet. For example, each information packet 100 transmitted by node 202 includes node transmission data concerning transmissions made by node 202, and each information packet 100 transmitted by node 204 includes node transmission data concerning transmissions made by node 204.

Wireless radios are typically able to transmit data using a variety of modulation schemes (e.g., BPSK, QAM, ODFM), error-correcting codes (e.g., ½-convolution encoding), or other settings (e.g., bandwidth, symbol duration, preamble type, guard interval length). Each setting combination usually, but not necessarily, results in different effective user data bit rates, so each setting combination may be referred to as a "rate." Many wireless radio devices are capable of dynamically selecting from a set of multiple supported rates when transmitting a packet. Typically the purpose for supporting multiple rates is because different rates will work better under different channel conditions.

In FIG. 2, when a node in the network transmits a wireless signal, any node which is "in range" can potentially receive the transmission. This is true regardless of whether an omnidirectional, directional, or a beam-forming antenna or array of antennas is utilized. Consider a radio with a set of rates with increasing levels of error correcting codes. As the level of error correction increases, in theory, the set of possible receivers also increases, the probability of each receiver successfully receiving the packet increases, but the amount of medium time required to transmit the packet also increases. This increase in medium-time consumption means that efficiency is decreasing as error correction is increasing (if the same transmission could have been received successfully with less error correction).

One technique in accordance with the invention to select the most efficient rate is for the node transmission data included in each information packet 100 to contain information encoding how many transmissions the transmitting node has made at each rate. One form of this would be a list of counters for the number of packets sent at each rate.

By overhearing packets that contain these counters, and maintaining state information, neighboring nodes in the network can determine the exact loss rates at which they are receiving information from a given node at each individual rate. For example, in FIG. 2, consider that nodes 202 and 204 are in range of each other and actively communicating. A third node, overhearing node 206, is in range of both nodes 202 and 204 and is able to overhear many or all of their transmissions. By observing the transmissions, overhearing node 206 is able to actively track its ability to receive successfully from nodes 202 and 204 at each rate. In addition, this capability allows overhearing node 206 to gather information about rates that it is unable to receive successfully by looking at the counters on packets that it did receive successfully. Since each packet contains the number of packets that the transmitting node transmitted at each rate, when a packet is successfully received, statistics on all of the rates can be updated.

Because node 206 is just a passive listener there is no network overhead for observing this information, meaning that node 206 does not consume any of the shared wireless medium resources while gathering this information. Only local processing and memory resources at node 206 are being consumed by overhearing packets and storing state information. If nodes 202 and 204 needed to communicate with node 206 (or through node 206) the information that node 206 maintains can be used to enable nodes 202 and 204 to immediately know the current best rate.

Figure 3:
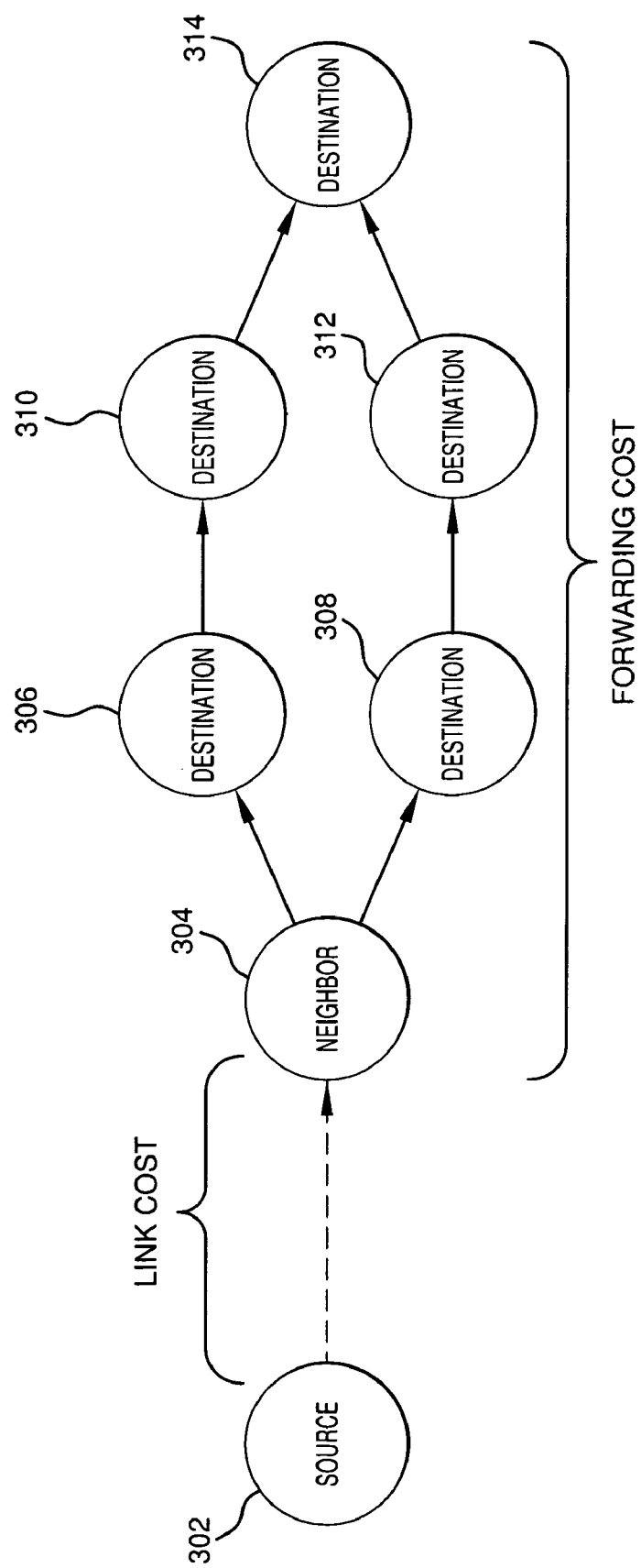
FIG. 3 is a schematic representation of another multi-node network in accordance with certain embodiments of the invention.

FIG. 3 depicts a wireless network including source node 302, neighbor node 304, and destination nodes 306, 308, 310, 312, and 314. The quality of transmissions between source node 302 and neighbor node 304 is measured by a link cost. Consider the decomposition of a route into a forwarding cost advertised by neighbor node 304 and link-cost estimate of source node 302 to that neighbor node 304. By overhearing the transmissions of neighbor node 304, source node 302 is able to determine its ability to receive packets from neighbor node 304. If the packets are all sequenced, source node 302 can determine the exact loss rates with respect to its ability to receive successfully transmissions from that neighbor node 304. These loss rates allow source node 302 to adjust its estimated cost of the link to neighbor 304. Since the link cost is part of the route cost of any route through neighbor node 304 (based on the above route cost decomposition), the source node's cost of all routes through the neighbor node are able to be updated each time that source node 302 overhears a packet transmitted by neighbor node 304, irrespective of which destination node that the source node is transmitting to, and irrespective of the source or destination of the packet being forwarded.

A temporal decay function may also be used to decay the link-cost metrics when information is not heard from a neighbor such as neighbor node 304. Typically routing protocols use timeouts to remove stale information from the routing table. A temporal decay function enables more fine-grained information decay and allows the protocol to make decisions based on the absence of updated information before waiting for a timeout to occur. The result of these methods is that at each packet reception and at each time step, the link metric to all of a node's neighbors can change. When neighbor link metrics change, the costs of all the routes through the neighbor also change. This allows nodes to continuously adjust their preferred routes to known destinations. Through a recursive step, all the nodes in the network can continuously adjust their routing pointers based on either new information that they overheard or based on the fact that they did not overhear any updated information.

Optionally, the overheard information can be used for performing a distributed receiver aided auto-rate selection technique. Auto-rate selection is traditionally performed by the sender, and typically is performed using only packet acknowledgment (or lack of acknowledgment) feedback from the receiver. Using the traditional mechanism, if a sender has not transmitted any packets to a particular neighbor in the recent past, it has no knowledge of which rate would be the most efficient. In an embodiment of the invention, by tracking the modulation reception statistics for all neighboring nodes, the sender's auto-rate selection can be enhanced. First, the sender has detailed information on which rates work well from the receiver to the sender to use as a starting point for selecting its own transmission rate. Also, the intended receiver has detailed overheard statistics of which rates work well from the sender to the receiver. This information is present even if the sender was not previously sending explicitly to the receiver. This information may be explicitly fed back from the receiver to the sender in order to aid the sender's auto-rate selection. Table 1 provides an example of modulation reception statistics tracked by overhearing:

TABLE 1

| Modulation (Bit Rate) | 1 | 2 | 4 | 8 | 16 | 32 | 64 | 128 Mbps |
|---|---|---|---|---|---|---|---|---|
| Source | 99% | 98% | 94% | 85% | 80% | 70% | 40% | 10% |
| Destination | 96% | 92% | 86% | 75% | 60% | 30% | 10% | 0% |

Such modulation reception statistics can be included in modulation statistics 106 in information packet 100.

In known routing protocols, when one node receives an advertisement from another node, the first node updates stored information used to make better forwarding decisions for packets that it will transmit. In another embodiment of the invention, the first node further processes the updated information to see if it can improve the forwarding decisions of neighboring nodes. If the node finds that it can improve the forwarding decision of a neighbor, then it triggers a local routing advertisement in order to send its neighbor the routing information necessary for it to use that improved route. For a routing protocol in accordance with this embodiment, a node must remember for each of its neighbors the metric for reaching a destination.

In this embodiment, a routing advertisement preferably contains a metric representing the advertising node's cost of reaching a destination. A route advertisement may be transmitted in a routing-protocol-specific control packet or inserted into routing header 104 of information packet 100. If route advertisements are inserted into routing headers, then every packet transmitted by a node would provide an updated route to that destination. This capability enables updated routing information to propagate at the speed of the data flow, which may be much faster than the speed of the control-packet updates.

When a node overhears packets flowing from a source to a destination, it continuously updates its route towards the source and destination. Preferably, each packet contains an updated routing metric allowing the overhearing node to receive an updated route metric towards the source/destination at the speed at which the data is flowing.

Optionally, by tracking overhearing ability information, which measures a node's ability to overhear transmitted packets, the node is able to establish extremely accurate link metrics to its neighbors that are forwarding packets. Examples of such overhearing ability information include loss rates with respect to overhearing, the signal strength or signal-to-noise ratio of the overheard packets, the node's ability to overhear transmissions at different modulation rates, and any combination of these. Those skilled in the art will recognize other factors that may be used.

For example, consider the network of FIG. 2, in which nodes 202 and 204 are in range of each other and actively communicating. Node 206 is in range of both nodes 202 and 204 and is able to overhear all or many of their transmissions. The link-metric information that node 206 maintains can be used to determine whether nodes 202 and 204 might communicate more efficiently by forwarding or relaying data traffic through node 206 as opposed to communicating over their existing communication route (either a direct link as shown in FIG. 2, or through other intermediate nodes not shown). By actively listening to the transmissions between nodes 202 and 204, node 206 can observe the cost of their route and can determine if the node 202→node 206→node 204 route would be more efficient then the existing node 202→node 204 route. If node 206 determines that it can increase the efficiency of the route, node 206 makes a local advertisement that informs nodes 202 and 204 of the available route though node 206, which may cause nodes 202 and 204 to change their forwarding next hop. This local advertisement need only be received by nodes 202 and 204 and need not be propagated through the entire network (although it could if desired). By adapting the route using only local coordination, the routing protocol can achieve increased scalability.

Preferably, every node that is in communication range of an active data flow (e.g., packet transmissions) continuously monitors link metrics and route metrics and continuously evaluates whether a route that the monitoring node could provide would result in a lower-cost route for the source/destination. Substantially instantaneous with the overhearing node receiving a packet and determining that it is capable of improving an active route, the overhearing node sends out a local routing advertisement that provides this updated routing information to nodes within its communication range. Essentially, every node in the network continuously monitors routing data that it overhears on packets or routing updates, and the network as a whole continuously attempts to make local routing adjustments to improve communications by shifting active data flows to route with better metrics.

In yet another embodiment of the invention, advertisements are communicated using a specific set of rules to ensure that the routing protocol is instantaneously loop free. In this embodiment each routing advertisement for an intermediate node contains the following:

a metric representing the intermediate node's cost of reaching the destination;

a sequence number, incremented by the destination; and a minimum-cost (or best metric) field that represents the minimum metric of all advertisements under that specific sequence number.

When a node makes a routing advertisement for the first time under a new destination sequence number, the advertisement contains the sequence number, its current cost estimate of reaching the destination, and the minimum cost that it has ever advertised under the current sequence number. When a router first advertises a new sequence number, the current cost and the minimum cost are always the same. When a node makes subsequent advertisements using the same sequence number, it sets its minimum cost to the minimum of the current cost and the existing minimum cost. The minimum cost must be strictly decreasing within the context of a single destination-sequence number.

When nodes receive route advertisements from their neighbors, they need to determine whether they can safely reach the destination through that neighbor without the possibility of creating a cycle in the network. By utilizing a set of specific rules to make this decision, the dynamic routing protocol is able to remain instantaneously loop free. As used here, "instantaneous loop freedom" is defined as existing if, at any particular moment, the state of the network is such that, tracing the path that packets would take through the network by inspecting route tables, the routes from each node to each destination terminate either at the destination or at a node with no further forwarding route (dropped packet). In other words, for instantaneous loop freedom to exist, tracing the time-frozen forwarding entries of a set of nodes must not result in an infinite cycle of repeated traversals.

In this embodiment, sequence numbers are used to deal with changing network link costs. A destination node generates conventional distance-vector advertisements with increasing sequence numbers. Each sequence number can be thought of as constructing an independent routing tree rooted at the destination node. For each sequence there is a strictly decreasing (over time) minimum-cost metric. Since nodes select only next hops that have a lower minimum-cost metric than they do, they can never select a node that has selected them. The result is that each sequence tree is loop free.

The normal rules of previously known distance-vector protocols ensure that packets will cross over only from an older tree to a newer tree, because each node may not select a next hop with an older sequence number once it has made an advertisement with a newer sequence number. In a protocol according to this embodiment of the invention, this strict ordering is not required. Instead, a less-restrictive version of this ordering is still held for the packets themselves. Each packet carries on it a "safe sequence" tag, which represents the oldest sequence tree to which it is safe to forward the packet. A sequence for a next hop is considered safe if the minimum advertised by the next hop is less than the minimum advertised by the current node. This rule ensures that the next hop's route for that sequence cannot eventually be through the current node.

When forwarding to a next hop, a node must move the packet safe-sequence tag up to at least the "oldest" of the continuous known safe sequences for that next hop. Thus if the topology has been stable for a period of time, this "oldest" safe tag will be a significantly earlier sequence number than the most recent sequence number generated by the destination. Nodes may remember the safety of a window of sequence numbers in the past in order to have the information necessary to route on older paths.

In order to recall the safety history for forwarding through a neighbor, each node must store the best metric advertisement it has made for any recent sequence number. Recent sequence number may be limited, such as a fixed window of size N sequence numbers or every sequence number within an elapsed time. In addition, a node must store the best metric advertisements made by that neighbor for any recent sequence number. If a node has not made an advertisement for a sequence, this guarantees that this sequence number is safe. If a node has made an advertisement for a sequence, but has not heard an advertisement for that sequence from its neighbor, this forms the "risk" condition.

In preferred embodiments, a node may forward through a neighbor if the most-recent sequences heard are a run of one or more safe sequences, possibly followed by some number of risk sequences. The oldest sequence number in a continuous run of safe sequences (possibly followed by risk sequences) is the minimum safe sequence number. The tag on a packet forwarded through this neighbor must be updated so that it is at least as recent as this value. If it is already more recent, then no change is required. It the packet is new (e.g., entering the network at this node), then the tag should be initialized to this value. A node must not forward through a neighbor with a recent unsafe sequence (possibly followed by risk sequences).

If a node receives a packet from a neighbor with sequence tag X, then that neighbor must consider X the beginning of a run of safe sequences. As a result, if the node receiving the packet has that neighbor sequence marked as a risk, then that node must change the mark for that sequence from risk to unsafe. This ensures that runs of safe followed by one or more risks are quickly invalidated in the event of an actual reversal in flow.

This means that a node's routing tables at any given instant may be setup such that a packet will indeed return to a node that it had been to earlier, but that the sequence tag of the packet will not be the same on the second visit, ensuring the packet will not traverse the same "loop" again. As a result, though a packet might be detoured, no actual routing loop is formed. All the forwarding tables (combined with the packet tag) lead to the final destination or dead end with the packet dropped.

Optionally, data may be kept in a data structure that keeps track of the best current next hop for each sequence number between the overall best cost next hop's sequence and the most-recently heard sequence. This data structure effectively serves the same purpose as a forwarding table, but it has the additional dimension of sequence number in addition to destination. Like a forwarding table, this data structure would be populated with the preselected best current routes so that the entire routing table would not need to be scanned as packets came in and needed to be routed. The data structure preferably contains, for each destination, the sequence number of the overall best route, the maximum sequence number for any known safe route, and a list of the best route for each sequence number in the range from best to max (inclusive). Each member of this list should be the best route currently known with a sequence number of that entry position or higher. Thus a route may be listed more than once. For example, a list in the form "required sequence=(route sequence, route cost)," with best sequence 5 and max sequence 8, might appear as follows: 5=(5, 10), 6=(7, 12), 7=(7, 12), 8=(8, 15).

Only one operation can make a previously safe next hop unsafe: making a route advertisement with a best metric value better than the next hop's best metric. Packets should not be routed through next hops that are unsafe. A node's current best next hop will not be invalided in this way, because a node's best metric cannot be better than its best-next-hop metric. But it is preferable to use current best-cost routing information when considering the safety of alternate next hops (ones with worse metrics). This may entail updating data structures of routes as advertisements are made.

A routing protocol in accordance with this embodiment of the invention is allowed to select next hops of better metric even if they are under older sequence numbers. This is especially useful in the case where routing advertisement delays through different prospective routes may be quite different. For example, sequence numbers along the active packet flow may be quite rapid, but alternative paths nearby but not on the data flow might have nontrivial delays. If the costs of these alternative routes become better than the primary route, the protocol would allow a safe switch to the better cost despite the information delay. This allows greater routing flexibility and improved performance under changing costs.

Figure 4A:
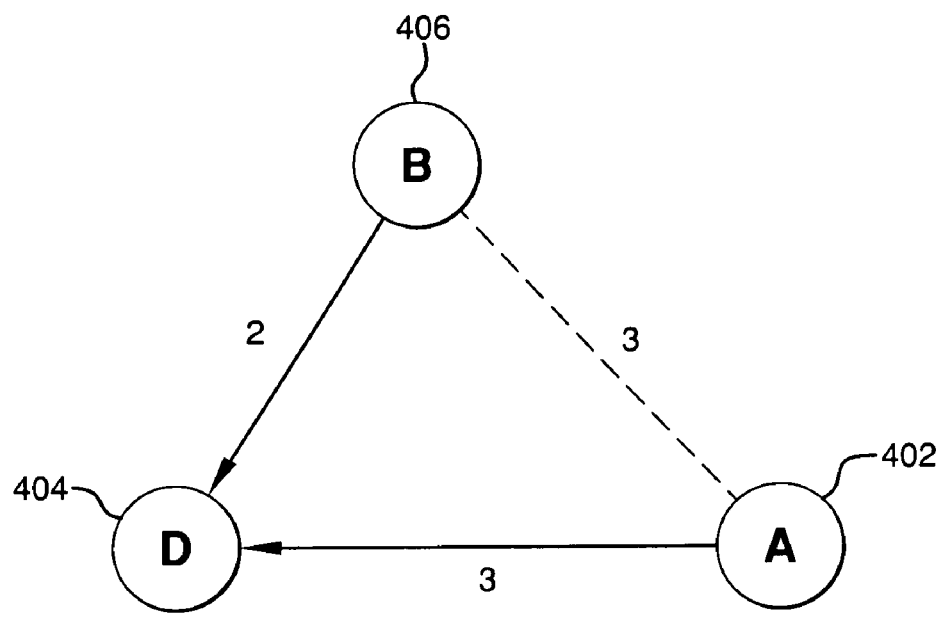
FIG. 4A is a schematic representation of another multi-node network in accordance with certain embodiments of the invention, in which there is route is from node A to node D.
Figure 4B:
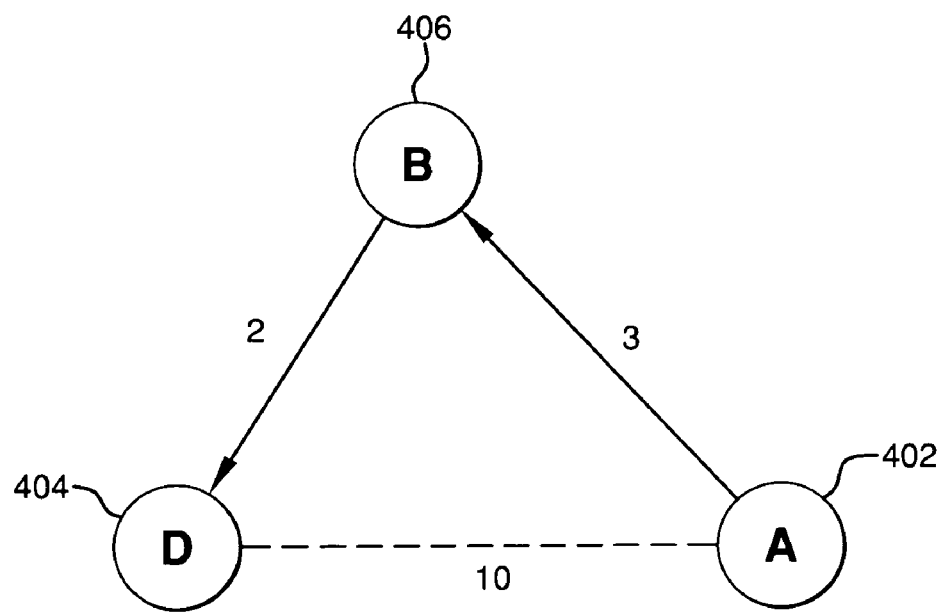
FIG. 4B is a schematic representation of the multi-node network of FIG. 4A, in which there is route is from node A to node B to node D.

An example of the operation of this embodiment is depicted in FIGS. 4A and 4B. Routing entries for the initial condition in FIG. 4A are provided in Table 2:

TABLE 2

| Node | Dest | Next Hop | Link Metric | Adv Metric | Best History (seq, best adv metric) |
|------|------|----------|-------------|------------|-------------------------------------|
| A | D | D | 3 | 0 | (3, 0), (4, 0), (5, 0) |
| A | D | B | 3 | 2 | (3, 2), (4, 2) |
| B | D | D | 2 | 0 | (3, 0), (4, 0) |
| B | D | A | 3 | 3 | (3, 3), (4, 3), (5,3) |

Routing entries for the changed condition in FIG. 4B are provided in Table 3:

TABLE 3

| Node | Dest | Next Hop | Link Metric | Adv Metric | Best History (seq, best adv metric) |
|------|------|----------|-------------|------------|-------------------------------------|
| A | D | D | 10 | 0 | (3, 0), (4, 0), (5, 0) |
| A | D | B | 3 | 2 | (3, 2), (4, 2) |
| B | D | D | 2 | 0 | (3, 0), (4, 0) |
| B | D | A | 3 | 3 | (3, 3), (4, 3), (5, 3) |

Advertisement history entries for FIGS. 4A and 4B are provided in Table 4:

TABLE 4

| Node | Dest | Best History (seq, best adv metric) |
|------|------|-------------------------------------|
| A | D | (3, 3), (4, 3), (5, 3) |
| B | D | (3, 2), (4, 2) |

In FIG. 4A, a destination node 404 (node D), and two other nodes 402 and 406 (nodes A and B). Links AB and AD each have an initial link metric of 3, and link BD has a link metric of 2. Node D has made routing advertisements for itself with destination sequence numbers 3, 4, and 5. Node A has received advertisements with all three of the sequence numbers, while node B has only received advertisements with sequence numbers 3 and 4. Nodes A and B have made advertisements with all the sequence numbers they have received.

A protocol according to this embodiment tracks information similar to that indicated in Tables 2-4. Each node, for each destination, for each available next hop, stores the metric of the link to that next hop, the most recent advertisement for the current total metric to that destination, and a best history. The best history consists of recent sequence numbers of advertisements made by that next hop for that destination and the most recent (i.e., best) best advertised metric for each sequence number. In addition, each node, for each destination, remembers a best history for its own advertisements. Under the initial conditions of FIG. 4A, node A's best route to D is via next hop node D with a total metric of 3. A has also advertised that is has a route to D with current total metric 3, sequence number 5, and best advertised metric 3 (as indicated in A's advertisement history entry for destination D).

In FIG. 4B, the link metric of the AD link has changed from 3 to 10. Ideally, after the link metric change, node A would switch its route to node D to use next hop node B. Unfortunately, this is not possible when using previously known destination sequenced distance vector routing protocols. Because node A had advertised a route with sequence 5, and it has not heard an advertisement for sequence 5 from node B, then it must assume that node B could select node A as its next hop at any point in time. If node A were to select node B and node B were to select node A, a routing loop would be created and persist until node B sent an updated advertisement that was successfully received by node A. An existing destination sequenced distance vector protocol would have to wait until an advertisement from node B with sequence 5 or greater was received by node A before node A could safely select node B as a next hop. But using a protocol in accordance with this embodiment of the invention allows node A substantially immediately to select node B as a next hop. Node A is free to advertise a route to node D with current total metric 5, sequence number 4, and best advertised metric 3. This is in contrast to previous destination sequenced distance vector protocols, where a lower sequence may never be advertised after advertising a higher sequence. A critical factor that allows this is the addition of the sequence tag to the header of each data packet. Node A may forward data packets with sequence tag 4 or lower to next hop node B. This covers the vast majority of packets, including packets originated by node A, which would be forwarded to node B with sequence tag 3 (oldest safe sequence known of current contiguous run of not unsafe sequence numbers: <3=unknown, 3=safe, 4=safe, 5=unknown, >5=safe). The qualitative effective result is that node A has substantially immediately switched its next hop to node B.

Instantaneous loop freedom is maintained because node A must forward data packets with sequence tag 5 to next hop node D rather than node B. Consider a modified example where in addition to the AD link metric change in FIG. 4B, link BD breaks (metric goes to infinity). This is exactly the looping risk case that previous destination sequenced distance vector protocols are forced to avoid by preventing node A from immediately selecting node B as a next hop. As node B's previous best route (directly to node D) is no longer available, it will select the next best option: a next hop of node A. While at first glance, this may seem like it would cause a routing loop, this is not the case. If node B forwards a packet to next hop node A, it will update the sequence tag to 5 (oldest safe sequence known of current contiguous run of not unsafe sequence numbers: <3=unknown, 3=unsafe, 4=unsafe, 5=safe). As a result, any packets forwarded to node A by node B will be sent by node A directly to node D rather than back to node B. A packet originating at node A will traverse the links AB, BA, AD with sequence tags 3, 5, 5 respectively. So, while this route travels across the same link twice and is forwarded by the same node twice, it is not a routing loop because it is finite and successfully terminates at the destination.

Furthermore, once a packet with sequence tag 5 is forwarded from node B to node A, node A can infer that node B considers node A to be safe at sequence number 5. As a result, node A may update its status for the safety of next hop node B at sequence 5 from unknown to unsafe. A preferred method of updating this status is to add the pair (sequence 5, best advertised metric infinity) to node A's best history for next hop node B. Once node A considers node B to be unsafe at sequence 5, it will no longer forward data packets with sequence tags of 4 or less to node B; rather they, like sequence tag 5 packets, will be forwarded to node D. Thus the first packet sent from either node A or node B will eliminate the AB, BA "cycle" automatically without any explicit routing advertisements.

Numerous other embodiments will be readily apparent to those skilled in the art. The entirety of this disclosure (including the Cover Page, Title, Headings, Field of the Invention, Background of the Invention, Summary of the Invention, Brief Description of the Drawings, Detailed Description of Preferred Embodiments, Claims, Abstract, Figures, and otherwise) shows by way of illustration various embodiments in which the claimed inventions may be practiced. In fact, the numerous embodiments may constitute numerous inventions, and reference to the "invention" was provided for the sake of simplicity and should not be viewed as a suggestion that disclosure provides description of a singular invention. The features and advantages described in the disclosure are of a representative sample of embodiments only, and are not exhaustive or exclusive. They are presented only to assist in understanding and teach the invention. It should be understood that they are not representative of all inventions that could be claimed.

In view of this, certain aspects of the invention have not been discussed in this disclosure. That alternate embodiments may not have been presented for a specific aspect of the invention, or that further undescribed alternate embodiments may be available for an aspect, is not to be considered a disclaimer of those alternate embodiments. It will be appreciated that many of those undescribed embodiments incorporate the same aspects of the invention that are described, and others are equivalent. Thus, it is to be understood that other embodiments may be utilized, and that functional, logical, organizational, structural, or topological modifications may be made without departing from the scope or spirit of the invention.

All examples or embodiments throughout this disclosure are intended to be non-limiting. Also, the only inference that should be drawn regarding those embodiments discussed relative to those not discussed is that embodiments were not discussed for purposes of reducing space and repetition. Some features discussed may be mutually contradictory, in that they cannot simultaneously be present in a single embodiment. Similarly, some features may be applicable to one or more aspects of the invention and inapplicable to others.

In addition, this disclosure may include other inventions not currently claimed. Applicants reserve all rights in any such currently unclaimed inventions, including the right to claim such inventions or file additional applications, continuations, continuations-in-part, or divisions. As such, it should be understood that advantages, embodiments, examples, functions, features, or other aspects of the disclosure, are not to be considered limitations on the disclosure as defined by the claims or limitations on equivalents to the claims.

What is claimed is:

1. A method for routing data through a network of two or more nodes, comprising:
   (a) enabling a first node to overhear packet transmissions from a second node;
   (b) determining a cost of transmitting packets from the first node to the second node;
   (c) storing state information regarding each overheard packet transmission; and
   (d) updating as necessary the cost of transmitting packets from the first node to the second node based on each overheard packet transmission, wherein the cost of transmitting packets from the first node to the second node is based at least in part on modulation statistics.

2. The method of claim 1, further comprising determining a route from the first node to a third node based on the cost of transmitting packets from the first node to the second node.

3. A method for routing data through a network of three or more nodes, comprising:
   (a) enabling an overhearing node to overhear packet transmissions from a source node to a destination node;
   (b) determining a cost of transmitting packets from the source node to the destination node;
   (c) determining a cost of transmitting packets from the source node to the overhearing node to the destination node;
   (d) storing state information regarding each overheard packet transmission;
   (e) updating as necessary the cost of transmitting packets from the source node to the destination node, and the cost of transmitting packets from the source node to the overhearing node to the destination node, based on each overheard packet transmission; and
   (f) when the cost of transmitting packets from the source node to the overhearing node to the destination node is less than the cost of transmitting packets from the source node to the destination node, sending an advertisement to the source node causing the packet transmissions to be routed from the source node to the destination node through the overhearing node.

4. A method for routing data through a network of three or more nodes, comprising:
   (a) for a first route from a source node to a destination, generating one or more advertisements with increasing sequence numbers;
   (b) for a second route from the source node to the destination node through an intermediate node, generating one or more advertisements with increasing sequence numbers;
   (c) including as metrics in each advertisement a current cost estimate for reaching the destination node and a minimum cost estimate for reaching the destination node advertised for the sequence number;
   (d) including a safe-sequence tag with any packet transmitted by any node;
   (e) updating each safe-sequence tag when it is received by another node;
   (f) storing in the source node a first history of best metrics for the first route;
   (g) storing in the source node a second history of best metrics for the second route;
   (h) storing in the source node a third history of advertisements made by the source node; and (i) applying predetermined rules to the minimum cost estimates in the first, second, and third histories to maintain loop freedom.

5. The method of claim 4, further comprising storing in each node in the network a plurality of histories of best metrics, each history corresponding to one of a plurality of routes to a plurality of destination nodes and one of one or more next-hop nodes to each destination node.

6. A memory storing instructions adapted to be executed by a computer processor to perform a method for routing data through a network of two or more nodes, the method comprising:
   (a) enabling a first node to overhear packet transmissions from a second node;
   (b) determining a cost of transmitting packets from the first node to the second node;
   (c) storing state information regarding each overheard packet transmission; and
   (d) updating as necessary the cost of transmitting packets from the first node to the second node based on each overheard packet transmission, wherein the cost of transmitting packets from the first node to the second node is based at least in part on modulation statistics.

7. The memory of claim 6, the method further comprising determining a route from the first node to a third node based on the cost of transmitting packets from the first node to the second node.

8. A memory storing instructions adapted to be executed by a computer processor to perform a method for routing data through a network of three or more nodes, the method comprising:
   (a) enabling an overhearing node to overhear packet transmissions from a source node to a destination node;
   (b) determining a cost of transmitting packets from the source node to the destination node;
   (c) determining a cost of transmitting packets from the source node to the overhearing node to the destination node;
   (d) storing state information regarding each overheard packet transmission;
   (e) updating as necessary the cost of transmitting packets from the source node to the destination node, and the cost of transmitting packets from the source node to the overhearing node to the destination node, based on each overheard packet transmission; and
   (f) when the cost of transmitting packets from the source node to the overhearing node to the destination node is less than the cost of transmitting packets from the source node to the destination node, sending an advertisement to the source node causing the packet transmissions to be routed from the source node to the destination node through the overhearing node.

9. A memory storing instructions adapted to be executed by a computer processor to perform a method for routing data through a network of three or more nodes, the method comprising:
   (a) for a first route from a source node to a destination, generating one or more advertisements with increasing sequence numbers;
   (b) for a second route from the source node to the destination node through an intermediate node, generating one or more advertisements with increasing sequence numbers;
   (c) including as metrics in each advertisement a current cost estimate for reaching the destination node and a minimum cost estimate for reaching the destination node advertised for the sequence number;
   (d) including a safe-sequence tag with any packet transmitted by any node;
   (e) updating each safe-sequence tag when it is received by another node;
   (f) storing in the source node a first history of best metrics for the first route;
   (g) storing in the source node a second history of best metrics for the second route;
   (h) storing in the source node a third history of advertisements made by the source node; and
   (i) applying predetermined rules to the minimum cost estimates in the first, second, and third histories to maintain loop freedom.

10. The memory of claim 9, the method further comprising storing in each node in the network a plurality of histories of best metrics, each history corresponding to one of a plurality of routes to a plurality of destination nodes and one of one or more next-hop nodes to each destination node.

* * * * *